(12) United States Patent
Chen et al.

(10) Patent No.: US 7,382,503 B2
(45) Date of Patent: Jun. 3, 2008

(54) SCANNING APPARATUS

(75) Inventors: Yen-Cheng Chen, Baoshan Township, Hsinchu County (TW); Chin-Yuan Lin, Taichung (TW)

(73) Assignee: Avision Inc. (TW)

( * ) Notice: Subject to any disclaimer, the term of this patent is extended or adjusted under 35 U.S.C. 154(b) by 837 days.

(21) Appl. No.: 10/845,267

(22) Filed: May 14, 2004

(65) Prior Publication Data
US 2005/0046913 A1 Mar. 3, 2005

(30) Foreign Application Priority Data
Sep. 3, 2003 (TW) .............................. 92124398 A

(51) Int. Cl.
H04N 1/04 (2006.01)
H04N 1/40 (2006.01)

(52) U.S. Cl. .................. 358/482; 358/483; 358/445; 358/443; 358/474

(58) Field of Classification Search ............. 358/445, 358/443, 483, 482, 497, 494, 474, 505, 512–514; 250/208.1, 234–236; 341/155
See application file for complete search history.

(56) References Cited
U.S. PATENT DOCUMENTS
6,958,830 B2 * 10/2005 Kono ...................... 358/443

2004/0001236 A1* 1/2004 Lee et al. ................. 358/474
2004/0105131 A1* 6/2004 Shih et al. ................ 358/445

FOREIGN PATENT DOCUMENTS
CN 1325230 12/2001
CN 1405724 3/2003
JP 2003060819 2/2003

* cited by examiner

Primary Examiner—Cheukfan Lee

(57) ABSTRACT

The scanning apparatus includes a movable chassis and a main board fixed on the body. A charge-coupled device module and a front end processing device are disposed on the chassis. An application-specific integrated circuit is positioned on the main board. After the charge-coupled device module detects a light analog signal, the application-specific integrated circuit communicates with the front end processing device through a command interface. Therefore, the light analog signal is converted into the light digital signal by the front end processing device, and then the light digital signal encoded into low voltage differential signaling form is transmitted to the application-specific integrated circuit for proceeding the subsequent image processing.

15 Claims, 3 Drawing Sheets

SCANNING APPARATUS

This application claims the benefit of Taiwan application Serial No. 092124398, filed Sep. 03, 2003, the subject matter of which is incorporated herein by reference.

BACKGROUND OF THE INVENTION

1. Field of the Invention

The invention relates in general to the image-processing device, and more particularly to a scanning apparatus 2. Description of the Related Art With the constant progress of technology, the integration and application of multimedia has become the emphasized part of current development. Various kinds of applications of multimedia have been developed in order to present data again in form of multimedia, which satisfies consumers' diversified need. So far, the scanner is undoubtedly one of the most powerful tools to process the still image. Due to the maturity of scanning technology and the rise of high-speed interface, scanners have become popular among the professional image workers and the ordinary users in recent years A scanner is used for scanning the paper documents and then transforming and saving the image as the digital files. It is a convenient way for users to spread, arrange and keep the original drafts. In order to present the original matter of those paper documents completely, the scanning quality of the scanners are especially important. Referring to FIG. 1, a block diagram illustrating a conventional scanner is shown. The conventional scanner includes a movable chassis 110 and a main board 150 fixed on the body of the scanner. The chassis 110 includes a charge-coupled device (CCD) module 115 for detecting a light signal. An application-specific integrated circuit (ASIC) 151 and an analog front end (AFE) processor 153 are arranged and disposed on the main board 150, for controlling the charge charge-coupled device module 115, and receiving the light signal and converting the light signal to digital form, respectively.

During scanning, the chassis 110 of the scanner moves along with the complete length of original document, and the charge-coupled device module 115 simultaneously detects the light signal, which is reflected or transmitted from the scanned document. The light signal corresponding to red light (R), green light (G) and blue light (B) in analog form is so called light analog signal RGB. After the charge-coupled device module 115 receives the light analog signal RGB, the application-specific integrated circuit 151 obtains the light analog signal RGB in accordance with the control signal (CTRL), and then proceeds the following procedures of image processing. Especially, the light analog signal RGB can not be processed by a computer directly, so that the light analog signal RGB is converted to a digital form by the analog front end processor 153. Afterward, the light digital signal DOS is transmitted through the BUS to the application-specific integrated circuit 151 through the BUS for the following image processing.

Additionally, the drive motor 155 and memory 157 are disposed on the main board 150. The drive motor 155 controls the movement of the chassis 110 in response with the command, which is transmitted from the application specific integrated circuit 151, such as the command of specific start-stop movement. The memory 157 is a data buffer area for storing scanning data temporarily.

In the practical operation, since the analog front end processor 153 and application-specific integrated circuit 151 are both disposed on the main board 150, there are numerous connecting lines between the main board 150 and the chassis 110. In addition to three light signal lines, each of which is for one of the three primary color (RGB) signals there are still other connecting lines for transmitting the various signals, such as the $\Phi 1$ and $\Phi 2$ signals of CCD control signal (CTRL), the reset signal, the power signal, and the grounding signal (GND). Please refer to FIG. 2, showing a layout illustrating a charge-coupled device module (CCD) manufactured by Sony Inc. The CCD product of Sony, commercially named ILX558K, requires twelve input/output pins and the numerous signal lines in the circuit connection, resulting in a high manufacture cost. Moreover, the conventional TTL/CMOS electronic standard is used as the controlling interface, in which a high voltage level, such as 5V and 3.3V, is applied, so that the electric power is consumed magnificently and the data transmission quantity is hard to be improved. Furthermore, the light analog signal RGB transmitted from the charge-coupled device module 115 to the main board 150 is easy to be interfered by the environmental factors, so that it impacts on the scanning quality and also may cause the electromagnetic interference (EMI) during the scanning operation. The drawbacks described above have the direct influence on the competitiveness of the commercial product, especially the scanner made for high scanning resolution. Accordingly, it is one of the important issues to improve the scanning quality and decrease the manufacturing cost.

SUMMARY OF THE INVENTION

It is therefore an object of the invention to provide a scanning apparatus to minimize the number of the connecting lines and diminish the electromagnetic interference in the data-transmission process.

It is another object of the invention to provide a scanning apparatus to ensure the fidelity of the light signal. The light analog signal is converted into the light digital signal on the chassis, and then the light digital signal is transmitted to the main board.

The invention achieves the above-identified objects by providing a scanning apparatus, including a movable chassis and a main board fixed on the body. The chassis includes a charge-coupled device module and a front end processing device. The main board includes an application-specific integrated circuit. After the charge-coupled device module receives a light analog signal, the front end processing device gathers the light analog signal and then converts it into a light digital signal. Afterward, the front end processing device encodes the light digital signal into a low voltage differential signaling form and then transmits it to the application-specific integrated circuit for further image processing. Implementing the scanning operation mentioned above, the application-specific integrated circuit communicates with the front end processing device through a command interface. Additionally, the command interface is compatible with a serial transmission standard, such as inter-integrated circuit (I²C) or RS-232, to reduce the number of the connecting lines. The front end processing device includes an analog front end processor and a signal generator. The analog front end processor is for converting the light analog signal to the light digital signal. The signal generator is for generating a control signal corresponding to operation of the charge-coupled device module and the analog front end processor. Besides, the front end processing device transmits the motor synchronous signal to the application-specific integrated circuit in order to control the motor, which can drive the optical disk device. The motor synchronous signal can be transmitted utilizing an exclusive signal line. Alternatively, the motor synchronous signal is encoded into the low voltage differential signaling form and then transmitted with the light digital signal.

Other objects, features, and advantages of the invention will become apparent from the following detailed description of the preferred but non-limiting embodiments. The following description is made with reference to the accompanying drawings.

DETAILED DESCRIPTION OF THE INVENTION

Figure 1:
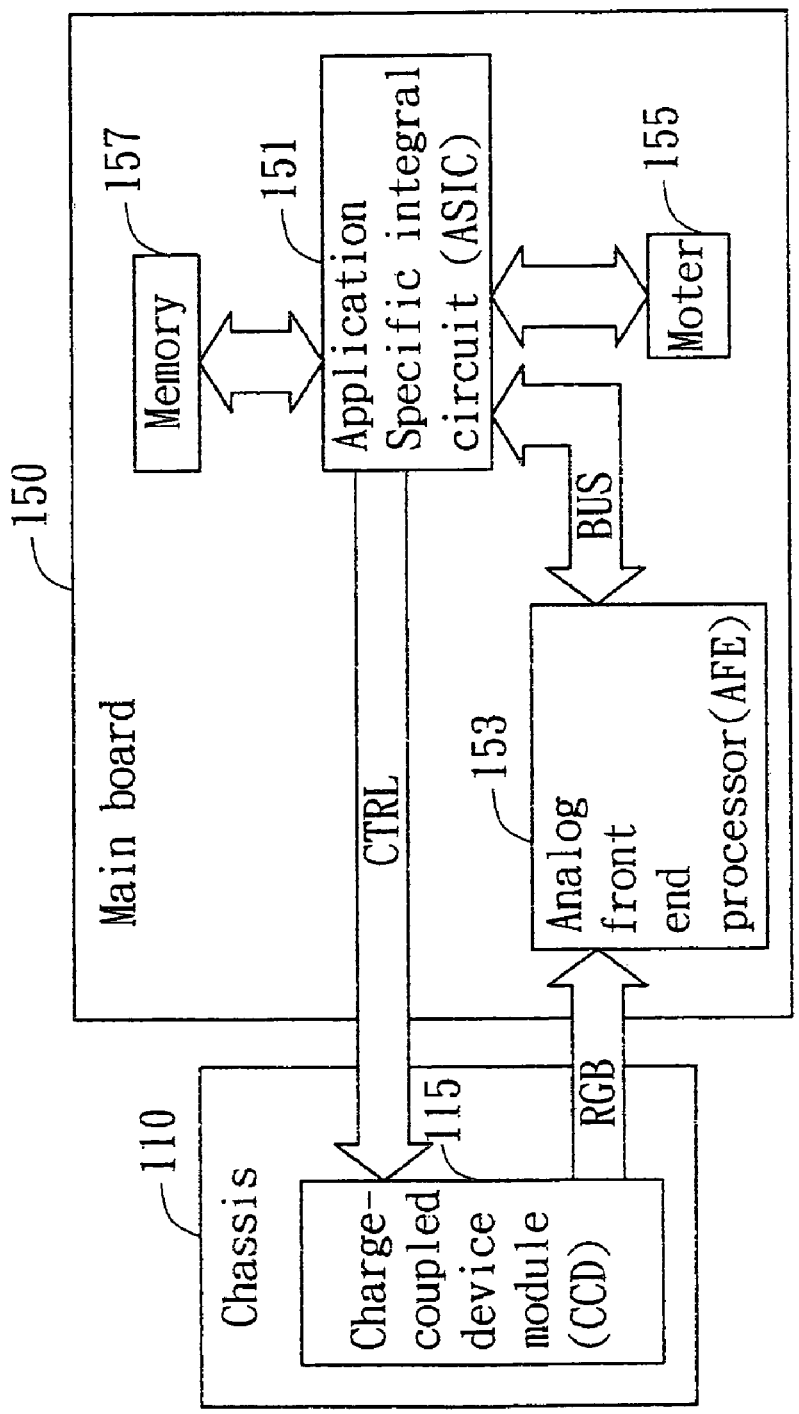
FIG. 1 is a block diagram illustrating a conventional scanner is shown.
Figure 2:
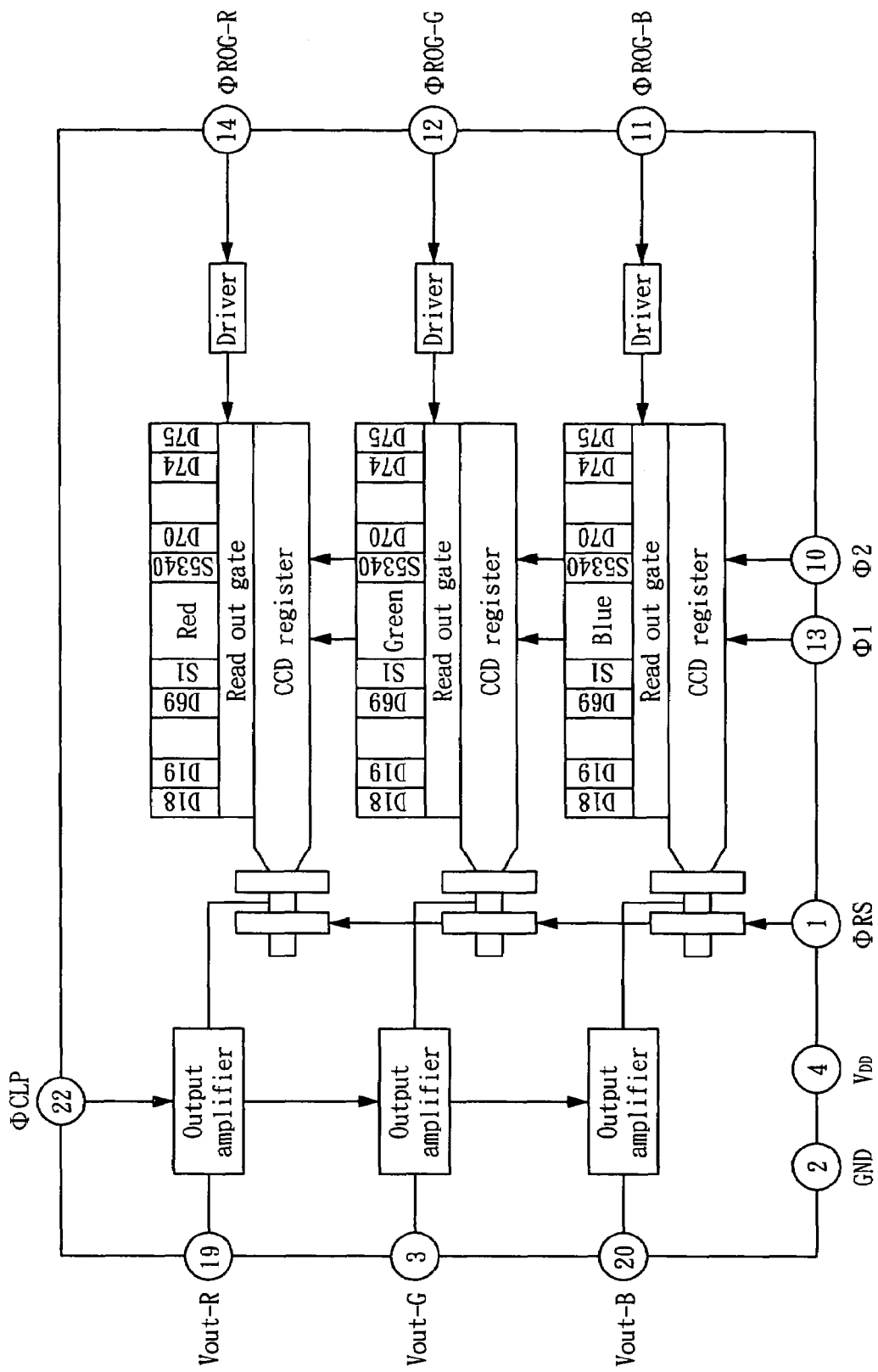
FIG. 2 is a layout illustrating a charge-coupled device module (CCD) manufactured by Sony Inc.
Figure 3:
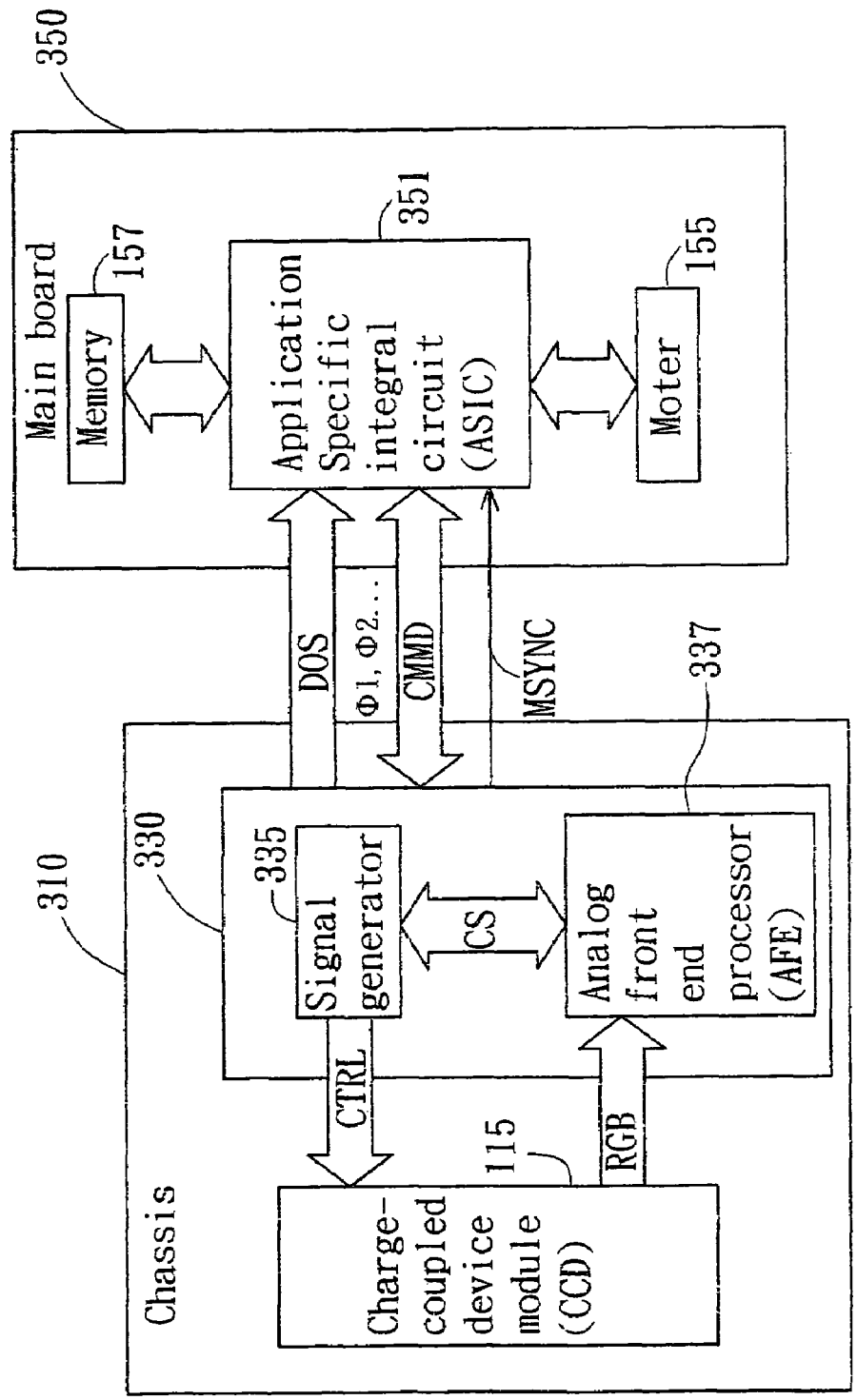
FIG. 3 is a block diagram illustrated a scanning apparatus in accordance with the preferred embodiment of the invention.

According to the preferred embodiment of the invention, the analog front end processing device, conventionally disposed on the main board, is now disposed on the chassis. After the charge-coupled device module detects the light signal, which is converted to the light digital signal by the analog front end device module immediately, the light signal in the digital form is transmitted to the main board for processing. Referring to FIG. 3, a block diagram illustrates a scanning apparatus in accordance with the preferred embodiment of the invention. The scanning apparatus includes a main board 350 and a chassis 310. An analog front end processor 337 and a signal generator 335 are disposed on the chassis 310. The analog front end processor 337 is responsible to convert a light analog signal RGB, sensed by a charge-coupled device module 115, into the light digital signal (DOS). Operation of the charge-coupled device module 115 and the analog front end processor 337 are controlled by the control signals CTRL and CS from the signal generator 335, respectively. In practical operation, the signal generator 335 and the analog front end processor 337 could be integrated in a front end processing device 330 to reduce the manufacturing cost. Furthermore, a chip with a designated function, such as an application-specific integrated circuit, could be used as the analog front end processing device 330.

Additionally, the application specific integrated circuit 351 communicates with the front end processing device 330 via a command line interface (CMMD), so that the light digital signal (DOS) is transmitted from the front end processing device 330 to the application specific integrated circuit 351 for proceeding the subsequent image processing. The command line interface (CMMD) is compatible with an inter-integrated circuit ($I^2C$) interface standard, or a serial transmission interface standard such as universal asynchronous receiver/transmitter (UART) interface standard or RS-232 interface standard, both of which could minimize the number of the connecting lines. In the scanning operation, the front end processing device 330 receives the command through the command line interface (CMMD) send from the application specific integrated circuit 351. According to the command, the front end processing device 330 gathers the image, converts the light signals, and feeds back the data; for example, checking table according to the command or making the communication protocol between the front end processing device 330 and application specific integrated circuit 351. Compared with the conventional scanning operation, the embodiment of the invention has the benefits that the front end processing device 330 at the chassis is able to produce the control signals (such as CTRL and CS) through an extremely simple command interface (CMMD)(such as $\Phi 1$ and $\Phi 2$) from the application specific integrated circuit 351. In other words, according to the command (CMMD), the front end processing device 330 generates correspondingly various control signal, such as control signal CTRL and CS, to receive and transform the light signal. Instead of the transmitting the complicated control signals from the main board 150 to the chassis 110, the procedure mentioned in the preferred embodiment can greatly reduce the number of the connecting lines between the main board and the chassis.

Moreover, it is important to prevent the electromagnetic interference during the transmission of a light digital signal (DOS) from the front end processing device 330 to the main board 350. After the analog front end processor 337 converts the light analog signal RGB into the light digital signal (DOS), the front end processing device 330 could further encode the light digital signal (DOS) before signal transmission. Then, the encoded light digital signal (DOS) is transmitted back to the application-specific integrated circuit 351 in a low-voltage differential signaling (LVDS) form. In practical operation, the low-voltage differential signal (LVDS) is preferably transmitted via differential pair connecting lines, such the optical fibers. Besides, the analog front end processor 337 of the invention is disposed on the front end processing device 330 for controlling directly the charge-coupled device module 115; therefore, if the standard of the charge-coupled device module 115 is changed, the analog front end processor 337 can be modified correspondingly without changing the design of the application-specific integrated circuit 351. In the manufacturing process, the standardized application-specific integrated circuit 351 can be allowed, and only the layout of the front end processing device 330 is optionally modified to satisfy the demands of various applications. According to the embodiment of the invention, utilizing the standardized application-specific integrated circuit 351 will greatly reduce the manufacturing cost, and also, applying the flexibly modifiable front end processing device 330 can release the degree of freedom in layout design. Therefore, the invention provides the layout designer with inexpensive resolution and flexible design, which can raise the competitiveness of the commercial products.

The embodiment of the invention also provides a preferred method of motor control for the best benefit. The motor synchronous signal (MSYNC) is transmitted from the front end processing device 330 to the application specific integrated circuit 351 for controlling the drive motor. Noted that the motor synchronous signal MSYNC is generated from the chassis 310 according to the practical scanning situation, and the action of the motor and the scanning procedure can be operated in coordination accurately. Conventionally, the drive motor is controlled by the application specific integrated circuit 351, so that the error is easily produced between the motor action and the scanning procedure. If there is no perfect feedback control between the drive motor 155 and the application specific integrated circuit 351, the error mentioned above might lead to a low fidelity of the scanning image with the scanned documents, and causing a bad influence on the scanning quality.

Additionally, the motor synchronous signal (MSYNC) can be transmitted with no extra connection line. In the practical operation, using a signal line for exclusively transmitting the motor synchronous signal (MSYNC) to the application specific integrated circuit 351 is accomplishable; however, this requires the extra connection line between the chassis 310 and the main board 350. In this preferred embodiment, the motor synchronous signal (MSYNC) is also encoded with the low voltage differential signal (LVDS). That is, one or more control signals of the motor synchronous signal (MSYNC) are added to the unit definition of the low voltage differential signal (LVDS) after encoding, so that the motor synchronous signal (MSYNC) and the light digital signal (DOS) are transmitted together through the same one signal transmitting line.

The scanning apparatus disclosed as statement above in accordance with the preferred embodiment of the invention includes the analog front end processor disposed on the chassis for transmitting the light signal back to the main board in the digital form. The scanning apparatus has several advantages, and listed below.

1. The command and light digital signal are transmitted in a serial method. It can greatly decrease the number of the connecting lines, and reduce the cost of the hardware and the complexity in manufacturing.

2. The light digital signal transmits in accordance with the low voltage differential signaling LVDS standard. The electric level of the LVDS signal is 3.3V or 1.5V, which is much lower than the TTL/CMOS standard, and therefore the electric power can be saved.

3. The low voltage differential signaling LVDS is characterized by high bandwidth (655 Mbps) and not easy to be interfered, so that it can transmit farther and has the excellent EMI characteristics, all of which can raise the scanning quality greatly.

4. In the practical operation, the application specific integrated circuit can be standardized while the front end processing device is modified to accommodate the various demand. When the demand is changed, the layout of the front end processing device is optionally modified, rather than re-designing the application specific integrated circuit, which is apparently known by the people in the art. Therefore, the invention broadens the design flexibility.

5. The front end processing device can be adapted with the various designing demands, such as accommodated with the various standards of the charge-coupled device modules. Compared with re-designing the complicated application-specific integrated circuit according to the conventional method, re-designing the front end processing device does shorten the development time, and the benefit of a highly competitive product follows.

While the invention has been described by way of example and in terms of a preferred embodiment, it is to be understood that the invention is not limited thereto. On the contrary, it is intended to cover various modifications and similar arrangements and procedures, and the scope of the appended claims therefore should be accorded the broadest interpretation so as to encompass all such modifications and similar arrangements and procedures.

What is claimed is:

1. A scanning apparatus having a chassis and a main board, wherein the chassis is connected to the main board for performing a scanning operation, the scanmng apparatus comprising:
   a charge-coupled device (CCD) module, disposed on the chassis for sensing a light analog signal;
   a front end processing device, disposed on the chassis and electrically coupled to the charge-coupled device module, the front end processing device comprising:
   an analog front end processor, electrically coupled to the charge-coupled device module for converting the light analog signal to a light digital signal; and
   a signal generator, electrically coupled to the charge-coupled device module and the analog front end processor, for generating a control signal corresponding to operation of the charge-coupled device module and the analog front end processor; and
   an application-specific integrated circuit (ASIC), disposed on the main board and communicating with the front end processing device through a command interface for processing the light digital signal transmitted from the analog front end processor of the front end processing device.

2. The scanning apparatus according to claim 1, wherein the light digital signal is encoded by the front end processing device and then transmitted to the application-specific integrated circuit in a low-voltage differential signaling (LVDS) form.

3. The scanning apparatus according to claim 2, wherein the low-voltage differential signal is transmitted using a differential pair transmission line.

4. The scanning apparatus according to claim 2, wherein the scanning apparatus comprise a drive motor controlled by the front end processing device.

5. The scanning apparatus according to claim 4, wherein the motor is driven in accordance with a motor synchronous signal transmitted from the front end processing device to the application-specific integrated circuit.

6. The scanning apparatus according to claim 5, wherein the motor synchronous signal is synchronously transmitted with the light digital signal in the low-voltage differential signaling form.

7. The scanning apparatus according to claim 6, wherein the motor synchronous signal synchronously transmitted with the light digital signal in the low-voltage differential signaling form is transmitted through a differential pair transmission line.

8. The scanning apparatus according to claim 4, wherein the command interface is compatible with a universal asynchronous receiver/transmitter interface standard.

9. The scanning apparatus according to claim 4, wherein the command interface is compatible with an inter-integrated circuit ($I^2C$) interface standard.

10. The scanning apparatus according to claim 4, wherein the command interface is compatible with a serial transmission interface standard.

11. The scanning apparatus according to claim 10, wherein the serial transmission interface standard is a RS-232 interface standard.

12. The scanning apparatus according to claim 1, wherein the command interface is compatible with a universal asynchronous receiver/transmitter (UART) interface standard.

13. The scanning apparatus according to claim 1, wherein the command interface is compatible with an inter-integrated circuit ($I^2C$) interface standard.

14. The scanning apparatus according to claim 1, wherein the command interface is compatible with a serial transmission interface standard.

15. The scanning apparatus according to claim 14, wherein the serial transmission interface standard is a RS-232 interface standard.

* * * * *